(12) United States Patent
Friesen

(10) Patent No.: US 11,503,769 B2
(45) Date of Patent: Nov. 22, 2022

(54) PROGRAMMABLE GRAIN CART FUNCTION CONTROL SYSTEM

(71) Applicant: Elmer's Welding & Manufacturing Ltd., Altona (CA)

(72) Inventor: Michael Ian James Friesen, Altona (CA)

(*) Notice: Subject to any disclaimer, the term of this patent is extended or adjusted under 35 U.S.C. 154(b) by 513 days.

(21) Appl. No.: 16/674,756

(22) Filed: Nov. 5, 2019

(65) Prior Publication Data

US 2020/0137957 A1    May 7, 2020

Related U.S. Application Data

(60) Provisional application No. 62/756,646, filed on Nov. 7, 2018.

(51) Int. Cl.
| | |
|---|---|
| *A01D 90/10* | (2006.01) |
| *B65G 33/12* | (2006.01) |
| *B65G 67/24* | (2006.01) |
| *A01B 59/04* | (2006.01) |
| *A01D 75/02* | (2006.01) |
| *B65G 43/00* | (2006.01) |
| *B65G 47/19* | (2006.01) |
| *B65G 53/66* | (2006.01) |
| *B65G 65/00* | (2006.01) |

(52) U.S. Cl.
CPC ............ *A01D 90/105* (2013.01); *A01B 59/04* (2013.01); *A01D 75/02* (2013.01); *B65G 33/12* (2013.01); *B65G 43/00* (2013.01); *B65G 47/19* (2013.01); *B65G 53/66* (2013.01); *B65G 65/005* (2013.01); *B65G 67/24* (2013.01); *B65G 2811/093* (2013.01); *B65G 2811/095* (2013.01); *B65G 2814/0302* (2013.01)

(58) Field of Classification Search
CPC ........ B65G 33/12; B65G 43/00; B65G 47/19; B65G 53/66; B65G 65/005; B65G 67/24; B65G 2814/0302; A01D 90/105; A01D 75/02; A01B 59/04; B60P 1/42
See application file for complete search history.

(56) References Cited

U.S. PATENT DOCUMENTS 10,572,141 B2 *    2/2020  Foster ................. A01B 69/008
10,647,240 B1 *    5/2020  Grieshop ................. B60P 1/42
(Continued)

*Primary Examiner* — James R Bidwell
(74) *Attorney, Agent, or Firm* — Ryan W. Dupuis; Kyle R. Satterthwaite; Ade & Company Inc.

(57) ABSTRACT

In a grain cart having an auger fold actuator, a gate actuator, and at least one spout actuator, a grain cart control system has an input device received within an operator cab to generate command signals responsive to operator commands, an electronic controller operatively associated with selected actuators of the grain cart, a valve actuator connected to each valve of the selected actuators of the grain cart, and stored programmable criteria to generate activation signals for the valve actuators in response to the command signals. Each mechanical function that is controlled also has a rotary potentiometer for positional feedback. To actuate any sequence, a joystick will send commands to the controller to activate a sequence. Since the controls according to the present invention are driven by a logic-based controller, various functions can be automated.

31 Claims, 2 Drawing Sheets

(56) References Cited

U.S. PATENT DOCUMENTS

| | | | |
|---|---|---|---|
| 2009/0321154 A1* | 12/2009 | Johnson | B60P 1/42 |
| | | | 180/53.4 |
| 2013/0211658 A1* | 8/2013 | Bonefas | A01D 43/087 |
| | | | 701/28 |
| 2014/0277963 A1* | 9/2014 | Van Mill | A01D 90/10 |
| | | | 701/50 |
| 2018/0242521 A1* | 8/2018 | Thomson | B65G 65/34 |
| 2018/0244477 A1* | 8/2018 | Stilborn | B65G 41/002 |
| 2019/0322461 A1* | 10/2019 | Banthia | B65G 67/24 |

\* cited by examiner

PROGRAMMABLE GRAIN CART FUNCTION CONTROL SYSTEM

This application claims the benefit under 35 U.S.C. 119(e) of U.S. provisional application Ser. No. 62/756,646, filed Nov. 7, 2018.

FIELD OF THE INVENTION

The present invention relates to a control system for use in controlling one or more functions of a grain cart, and more particularly, the present invention relates to a programmable control system which is controls one or more grain cart functions according to programmed criteria.

BACKGROUND

A typical grain cart has several functions that the user must control using tractor hydraulics: (i) Auger fold/unfold, (ii) Auger spout adjustment In/Out/Front/Back, (iii) Gate open/close, and (iv) Auger Tilt Up/Down. Normally these are all manually controlled with the SCV (Selective Control Valves) on the tractor by the operator.

Competitors have wired a joystick directly into the valve block so that the user has control on the Joystick pendant but it is simply using on/off buttons. This means that to fold, they must hold the button down during the entire fold or unfold events. If there was no joystick present, a user could control all functions using the SCV's on the tractor which do have automatic detents in which they can be activated and run for a specific length of time; however, this cannot control functions according to varying criteria, for example varying the velocity of the actuation during the fold. Prior art systems require the user to set the hydraulic flow to the highest acceptable setting for the full range of motion. The prior art systems allow do not allow for sequential circuit activation.

SUMMARY OF THE INVENTION

According to one aspect of the invention there is provided a grain cart control system for a grain cart connected to a towing vehicle in which the grain cart includes an auger fold actuator for folding and unfolding an unloading auger of the grain cart, a gate actuator for opening and closing a gate of the grain cart, and at least one spout actuator for controlling orientation of a spout of the unloading auger, each actuator including first and second valves associated therewith for controlling actuation in opposing first and second directions of the actuator; the control system comprising:

an input device adapted to be received within an operator cab of the towing vehicle to receive operator commands from an operator of the towing vehicle and generate corresponding command signals responsive to the operator commands;

an electronic controller adapted to be operatively connected to the input device and operatively associated with at least one of the actuators of the grain cart;

a valve actuator adapted to be operatively connected to each valve of said at least one of the actuators of the grain cart;

the controller including programmable criteria stored thereon whereby the controller is operable to generate activation signals for the valve actuators according to the programmable criteria in response to receipt of the command signals from the input device.

According to a preferred embodiment, an electronic controller has been implemented onto a grain cart that can control a hydraulic valve block that can control each one of the functions of the grain cart. Each mechanical function that is controlled also has a rotary potentiometer for positional feedback. To actuate any sequence, a joystick will send commands to the controller to activate a sequence and control the function using Electro/Hydraulic Pulse width modulated valves (PWM).

Since the controls according to the present invention are driven by a logic-based controller, various functions can be automated. For example, the fold/unfold can be initiated by pressing twice on the fold button and the system will automatically complete the fold. Likewise on the unfold. In prior art systems, users would need to press and hold the button during the entirety (usually 30-40 seconds).

The fold sequence can be monitored by a potentiometer that reads the angle of the auger during fold and allows us to proportionally control this sequence effectively optimizing its velocity to be fast in the mid swing, and slow down at the end points not to generate a hard landing and damaging components. This configuration has enabled folding times to be decreased from approximately 25-30 seconds down to 12 seconds with no damage to components from unwanted decelerations.

Also, during this time, the auger tilt can also be actuated by this same sequence to tilt the auger up while unfolding to a desirable position. In prior art systems these two features would need to be controlled at the same time.

During the fold sequence, the controller can also control the spout so that it will automatically rotate to a storage position. If it does not do this, it will contact the tank of the cart while folding down causing damage.

In the illustrated embodiment, each valve actuator is an electro-hydraulic pulse width modulated valve actuator.

Preferably, the controller is arranged to generate activation signals associated with more than one actuator of the grain cart in response to one or more command signals that define a single operator command.

The command criteria defining one operator command preferably comprises a unique sequence of button actuations on the input device. For example, the command criteria defining one operator command may comprise two sequential actuations of a common button on the input device. The command criteria defining one operator command may alternatively comprises two sequential actuations of two different buttons on the input device. In a further arrangement, the command criteria defining one operator command comprises simultaneous actuation of two different buttons on the input device. The command criteria defining one operator command may further comprise continuous actuation of a single button on the input device for a duration which exceeds a prescribed threshold.

The activation signals generated in response to determination of a single operator command may comprise activation signals arranged to operate one of the actuators for a prescribed duration, or alternatively until a prescribed position is reached.

When the system further comprises a position sensor associated with one of the actuators to detect a position thereof, the activation signals generated in response to determination of a single operator command comprise activation signals arranged to operate said one of the actuators until the position thereof reaches a prescribed target value. Preferably the prescribed target value is programmably adjustable by the operator.

The activation signals generated in response to determination of a single operator command may comprise activation signals arranged to actuate two different ones of the actuators in sequence.

The controller may be arranged to generate activation signals for one of the actuators based upon a sensed condition associated with a different one of the actuators.

Preferably each valve actuator is arranged to open the respective valve at a selected hydraulic flow rate with a range of selectable flow rates and the activation signals generated by the controller include a designation of the selected hydraulic flow rate. The controller may be arranged to generate activation signals which designate a flow rate which is fixed for a duration of activation of the actuator, or alternatively which designate a flow rate which varies during activation of the actuator. In one example, when a position sensor is associated with one of the actuators to detect a position thereof, the controller may be arranged to generate activation signals for said one of the actuators which designate the flow rate such that the flow rate varies according to the position detected by the position sensor.

When the grain cart includes a tilt actuator for tilting the unloading auger, the operator command may correspond to an auger unfolding command for unfolding the unloading auger. In this instance, the controller may be arranged to generate activation signals for the fold actuator to fully unfold the unloading auger and activation signals for the tilt actuator to vary a slope of the unloading auger in response to command signals from the input device which meet the command criteria associated with the auger unfolding command.

When a position sensor is associated with the tilt actuator to detect a position of the tilt actuator, the controller may be arranged to generate activation signals to actuate the tilt actuator until the sensed position reaches a prescribed target value in response to the command signals from the input device which meet the command criteria associated with the auger unfolding command.

In one example, the operator command corresponds to an auger unfolding command for unfolding the unloading auger. In this instance, the controller is preferably arranged to generate activation signals for the fold actuator to fully unfold the unloading auger and activation signals for the spout actuator to vary an orientation of the spout relative to the unloading auger in response to command signals from the input device which meet the command criteria associated with the auger unfolding command.

When a position sensor is associated with the fold actuator to detect a position thereof and the operator command may correspond to an auger unfolding command for unfolding the unloading auger, the controller is preferably arranged to generate activation signals for the fold actuator to fully unfold the unloading auger in response to command signals from the input device which meet the command criteria associated with the auger unfolding command, in which the controller is arranged to generate the activation signals with a designated flow rate associated therewith which varies according to the position detected by the position sensor.

The controller may be arranged to generate the activations signals such that the flow rate increases through an intermediate portion of the auger unfolding relative to at least one end portion of the auger unfolding.

In another example, the operator command corresponds to an auger folding command for folding the unloading auger, in which the controller is preferably arranged to generate activation signals for the fold actuator to fully fold the unloading auger and activation signals for the gate actuator to fully close the gate in response to command signals from the input device which meet the command criteria associated with the auger unfolding command.

When the operator command corresponds to an auger unfolding command for folding the unloading auger, the command criteria defining the auger unfolding command preferably comprises two sequential actuations of a common button on the input device, and the controller is preferably arranged to generate activation signals for the fold actuator to fully unfold the unloading auger in response to command signals from the input device which meet the command criteria associated with the auger unfolding command.

In another example, the operator command corresponds to an auger folding command for folding the unloading auger, in which the command criteria defining the auger unfolding command comprises two sequential actuations of a common button on the input device, and in which the controller is arranged to generate activation signals for the fold actuator to fully fold the unloading auger in response to command signals from the input device which meet the command criteria associated with the auger folding command.

When used on a grain cart including a tilt actuator for tilting the unloading auger in which the system further comprises position sensors associated with the tilt actuator and the gate actuator respectively to detect positions thereof, the controller may be further arranged to generate activation signals to operate the gate actuator such that the position of the gate actuator is proportional to the position of the tilt actuator.

When the control system further includes a position sensor associated with the gate actuator, the controller may be further arranged to generate activation signals for the gate actuator such that a position of the gate actuator is proportional to a moisture setting stored on the controller.

The moisture setting may be input by an operator, or alternatively, a moisture sensor may be arranged to sense a moisture content of a product stored on the grain cart, such that the controller is arranged to determine the moisture setting according to the sensed moisture content.

The control system may further include a plug sensor to detect a plug in the unload auger and a drive actuator adapted to be operatively connected between a drive input and a bottom auger of the grain cart in which the drive actuator is operable between an engaged position in which the drive input is engaged with the bottom auger and a disengaged position in which the drive input is disengaged with the bottom auger. In this instance, the controller may be further arranged to generate activation signals to displace the drive actuator into the disengaged position in response to the plug sensor detecting a plug and to displace the drive actuator into the engaged position in response to the plug sensor detecting absence of a plug.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
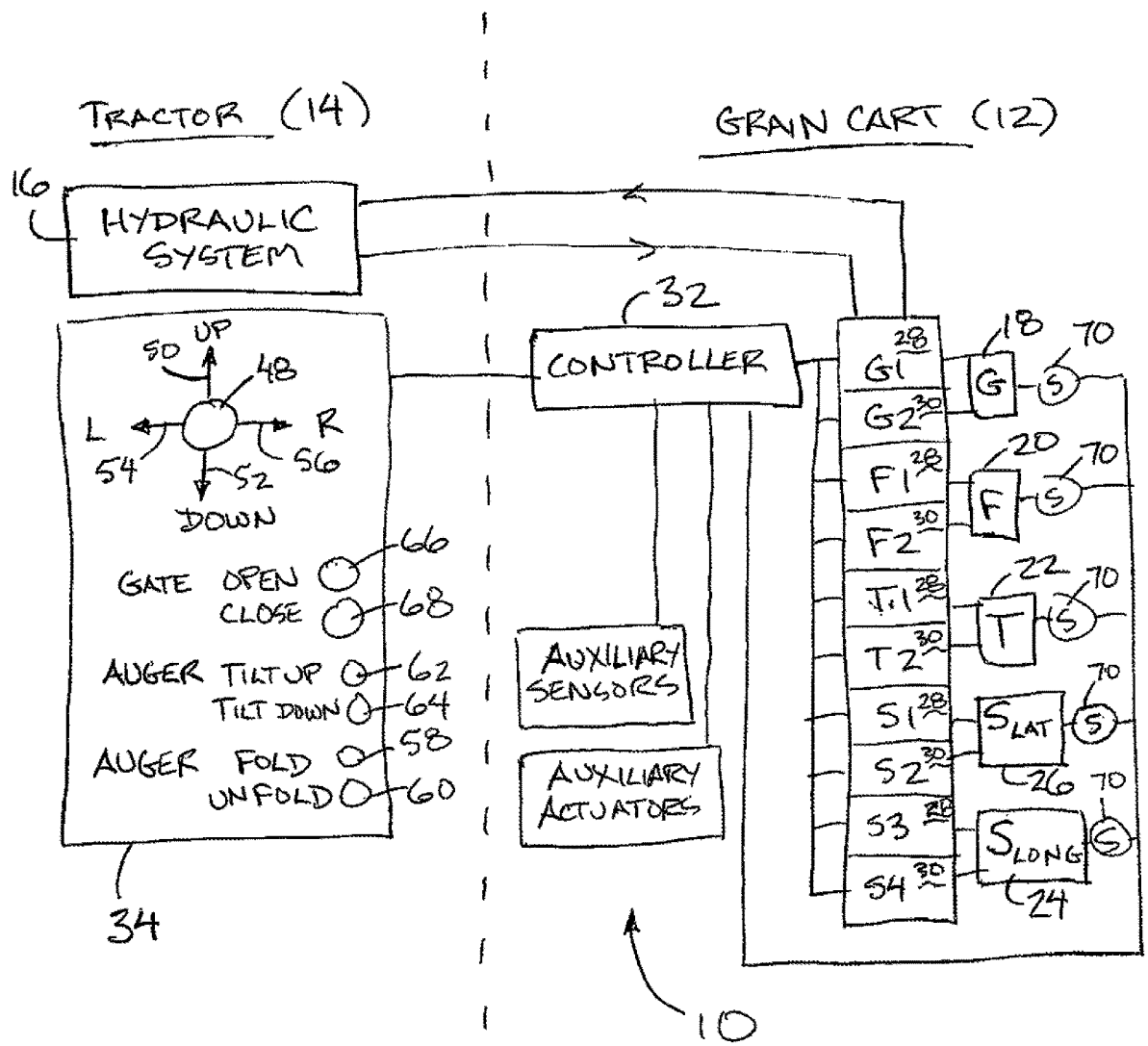
FIG. 1 is schematic representation of the grain cart control system according to the present invention.
Figure 2:
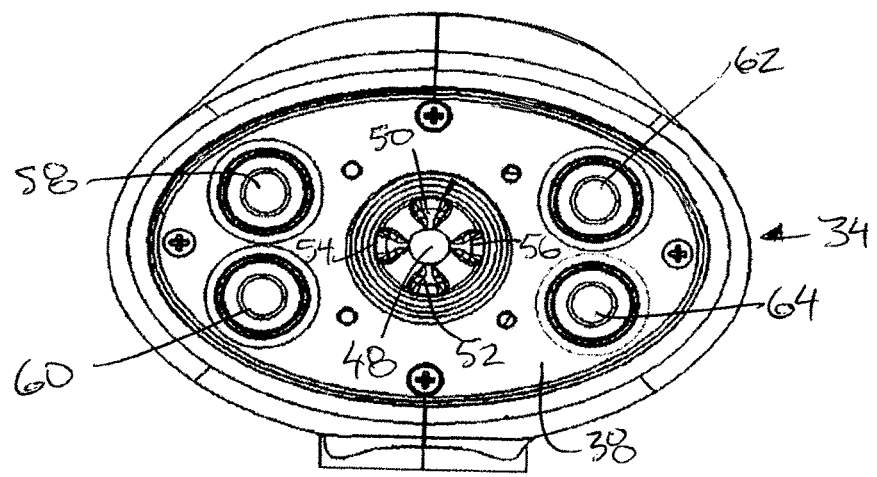
FIG. 2 is a top view of an operator input device for being supported in the operator cab of a tractor towing a grain cart.
Figure 3:
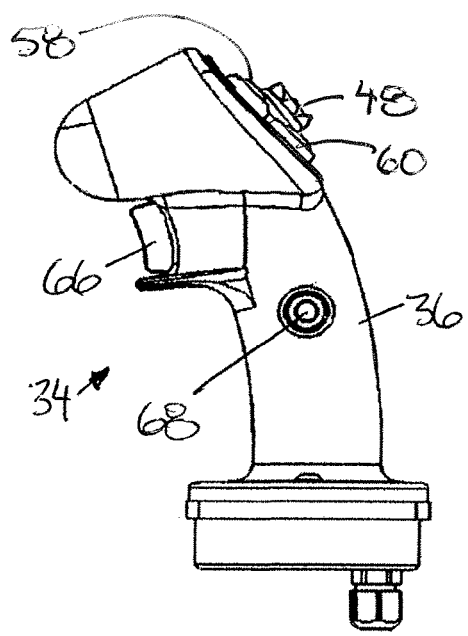
FIG. 3 and FIG. 4 are side elevational and rear elevational views of the operator input device according to FIG. 2.
Figure 4:
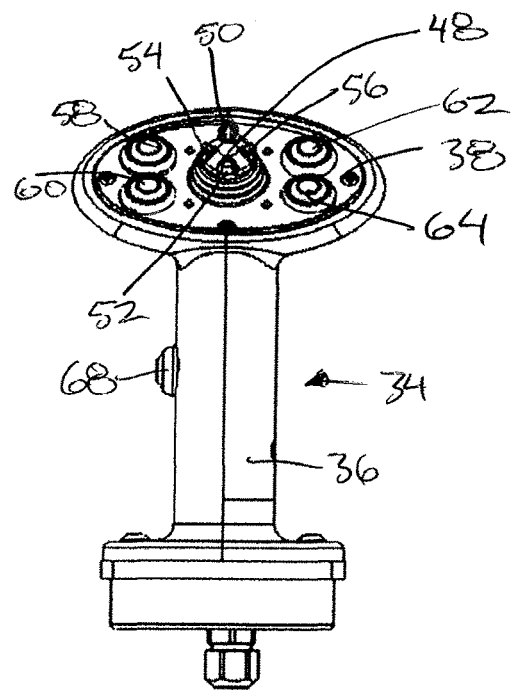

Referring to the accompanying figures there is illustrated a grain cart control system general indicated by reference numeral 10. The system 10 is particularly suited for use with a grain cart of the type including a hitch for towing connection to a suitable tractor 14.

A typical tractor 14 includes a frame supported on wheels for rolling movement along the ground and an operator cab with operator controls therein for controlling operation of the tractor. A motor on the tractor drives the hydraulic pump of a hydraulic system 16 that includes various circuits for controlling the function of various accessories of the tractor. A plurality of auxiliary circuits are also provided on the tractor to connect to corresponding control circuits on the grain cart.

A typical grain cart 12 includes a frame supported on wheels for rolling movement along the ground and which supports the hitch thereon that connects to the tractor. A tank is provided on the frame for receiving seed therein. A bottom gate is provided at the bottom of the tank which includes a gate actuator 18 connected thereto such that operating the gate actuator in opposing first and second directions functions to open and closed the bottom gate respectively.

A horizontal auger is typically provided below the bottom gate such that the auger receives particulate material from the tank when the bottom gate is opened for conveying the particulate material longitudinally towards one end of the cart. An unloading auger is mounted at one end of the cart so that an inlet end of the unload auger is in open communication with the horizontal auger to receive particulate material from the bottom auger and convey the particulate material upwardly from the inlet end to the outlet end of the unload auger. A spout is mounted at the outlet end of the unload auger for directing the flow of particulate material discharged from the unload auger. The unload auger is typically provided with a central hinge permitting the unload auger to be folded to reduce the overall length thereof in a stored position. A fold actuator 20 is operatively connected between upper and lower sections of the unload auger such that actuation of the fold actuator in opposing first and second directions functions to fold and unfold the unload auger respectively.

In some instances, the unload auger extends upwardly at a slope oriented in the lateral direction relative to the grain cart while being pivotally connected to the frame of the cart at the inlet end thereof such that the angle of inclination of the unload auger when unfolded into a deployed configuration is adjustable about a tilt axis oriented in the longitudinal direction of the cart. A tilt actuator 22 is operatively connected between the lower section of the unload auger and the frame of the cart such that actuation of the tilt actuator in opposing first and second directions functions to vary the tilt angle upwardly or downwardly respectively.

The spout of the unload auger is typically supported for angular adjustment about two different perpendicular axes relative to the upper section of the unload auger. More particularly a longitudinal spout actuator 24 is coupled between the spout and the unload auger to control forward and rearward displacement of the free end of the spout in the longitudinal direction of the grain cart relative to the unload auger such that actuation of the longitudinal spout actuator in opposing first and second directions functions to vary the angular orientation of the spout in the longitudinal direction about a laterally oriented axis. In addition, a lateral spout actuator 26 is coupled between the spout and the unload auger to control side to side displacement of the free end of the spout in the lateral direction of the grain cart relative to the unload auger such that actuation of the lateral spout actuator in opposing first and second directions functions to vary angular orientation of the spout in the lateral direction about a longitudinally oriented axis.

Each actuator described above comprises a double acting linear hydraulic piston cylinder actuator having first and second ports connected to respective hydraulic circuits of the grain cart by a respective first valve 28 and a respective second valve 30. In this manner the actuator can be extended and retracted to control actuation of the respective component of the grain cart in opposing first and second directions by opening the respective one of the first valve 28 or the second valve 30 to supply hydraulic fluid from the hydraulic system 16 of the tractor to the corresponding circuit on the grain cart.

The control system 10 according to the present invention is distinguished from the prior art control systems for grain carts in that the first and second valve 28 and 30 of each of the above noted actuators 18, 20, 22, 24 and 26 comprises an electro/hydraulic pulse width modulated valve. Accordingly, the rate of hydraulic fluid flowing through the valve when the valve is opened can be readily controlled by modulating the pulse width of the activation signal communicated to the valve. The valves are typically mounted on the grain cart as a bank of valves in communication with an electronic controller 32 of the system 10 which is also mounted on the grain cart. The controller 32 is a computer controller comprising a memory storing programming instructions thereon and a processor arranged to execute the programming instructions stored on the memory so as to execute the various functions of the control system as described in the following. The programming instructions stored on the controller define programmable criteria which dictates how the valves are controlled according to operator commands received by the electronic controller as described in the following.

The control system 10 further includes an input device 34 adapted to be mounted within the operator cab of the tractor so as to be in communication with the controller 32, either by wireless or wired communication. The input device includes a plurality of buttons thereon which can be activated by the operator to generate command signals corresponding to different operator commands so that the command signals are transmitted to the electronic controller 32.

The input device 34 comprises a main control stick 36 having a handle grip adapted to be gripped within a single hand of an operator. A main face 38 of the main control stick 36 is fully accessible by the thumb of the operator to enable actuation of any buttons on the main face 38 using the thumb of the operator when gripping the handle portion within the hand of the operator. More particularly the main face includes a thumb actuated joystick 48 thereon in the form of a joystick which can be deflected into either one of four directions corresponding to an upward deflection 50, a downward deflection 52, a leftward lateral deflection 54, and a rightward lateral deflection 56 and which includes spring biasing to return the joystick to a central neutral position when released by the thumb of the operator. Deflection of the joystick 48 in the four directions of up, down, left and right results in the generation of corresponding front, back, left and right command signals communicated to the controller.

The main face of the control stick 36 also includes an auger fold button 58 and an auger unfold 60 the button arranged to generate an auger fold command signal and an auger unfold command signal respectively when activated by the operator.

The main face of the control stick also includes an auger up button 62 and an auger down button 64 which are arranged to generate an auger tilt up command signal and an auger tilt down command signal respectively when activated by the operator.

The control stick also includes a gate open button 66 positioned to be actuated as a trigger aligned with the index finger of the user when the handle of the main control stick is gripped in the hand of an operator and a gate close button 68 positioned to be actuated by the thumb of the operator at one side of the handle grip of the main control stick. The gate open button 66 and the gate close button 68 are arranged to generate a gate opening command signal and a gate clothing command signal respectively when activated by the operator.

The system 10 also includes a plurality of feedback sensors 70 in which one sensor is associated with each of the actuators. The sensors 70 associated with the actuators may comprise rotary potentiometers capable of generating a position signal representative of a position of the respective actuator between opposing ends of the full range of motion of the actuator. The sensors are in communication with the controller for communicating the sensed data as position signals or other sensed data signals back to the controller.

The programming instructions of the controller are configured such that the controller monitors any signals from the input device 34 as well as any data from the sensors and compares the input data to various operating criteria. The instructions stored on the controller includes various command criteria which define a plurality of operator commands which can be determined by the controller upon receipt of input data that matches the corresponding command criteria. The command criteria may be a prescribed pattern of one or more button actuations for example which can be identified or recognized by the controller.

In a simple manual mode of operation, pattern recognition is not required as the simple actuation of any one of the buttons on the input device 34 generates a command signal of duration corresponding to the duration that the button is pressed by the operator. The controller receives the corresponding command signal from the input device along with the duration of actuation and then generates appropriate activation signals for the corresponding actuator valve of the corresponding actuator to activate the actuator in the direction of actuation associated with the corresponding button pressed by the operator for a duration corresponding to the duration of the button was pressed.

Alternatively, in an automated command mode of operation, the controller can monitor the various input devices and compare the activation signals input into the device together with the sensed data from the sensors to determine if the command criteria associated with one or more commands has been met. Examples of criteria to be met, or input data patterns that are identifiable by the controller as a corresponding command include a combination of different button inputs such as a prescribed sequence of prescribed button activations or the simultaneous actuation of two or more buttons on the input device. The duration of activation can also be used as an input such that a momentary actuation of one of the buttons for a duration less than a lower limit threshold or the holding of one of the buttons for a prescribed duration that exceeds an upper limit threshold amount stored on the controller can also be used to identify a prescribed command as opposed to simply interpreting the activation signal in the simple, manual mode of operation.

Each identified command typically includes a prescribed set of activation signals associated with one or more actuators to execute a more complex control of one or more functions of the grain cart as compared to the direct actuation of a single actuator when in the simple, manual mode of operation. The series of activation signals associated with a prescribed command may include an overall duration of actuation between start and stop times thereof, the positional control of an actuator to actuate the actuator in a prescribed direction until the positional signal from the corresponding feedback signal reaches a target value or a target range of values, the control of the rate of hydraulic fluid flowing through the respective valve, the control of one actuator based on the operating condition or position associated with another actuator, or a combined control of two or more actuators operated in sequence or simultaneously at prescribed rates and durations.

The controller may also be connected to one or more additional auxiliary sensors such as a wheel speed sensor, or a plugging sensor capable of detecting a plugging condition in one of the augers.

The controller may also be connected to one or more auxiliary actuators such as a drive connector arranged to disconnect drive to the horizontal bottom auger of the grain cart for example.

Activation signals generated for the actuators according to either the simple manual mode or the automated command mode of operation can dictate the flow rate associated with the valve being actuated by pulse width modulation according to predetermined settings stored on the controller which may be adjusted by an operator through the programming interface. The flow rate may be dictated as a constant value throughout a given activation, or the flow rate may vary by position or duration of activation. For example the flow rate may be increased through an intermediate range of operation of the actuator relative to the end of the range of operation. The intermediate range may correspond to the actuator being displaced through an intermediate portion of the overall range of movement of the actuator or an intermediate duration within the overall range of duration of actuator activation.

As noted above, the activation signal generated for the actuators can include activation signals associated with a single actuator or with a plurality of actuators which are instructed to be operated in a prescribed sequence or simultaneously with one another in response to determination of the criteria for a single command having been met.

Examples of the various functions which can be accomplished according to the present invention are described in the following.

For example, the fold/unfold can be initiated by pressing twice on the fold button and the system will automatically complete the fold. Likewise, on the unfold. In prior art systems, users would need to press and hold the button during the entirety.

Our fold sequence is monitored by a potentiometer that reads the angle of the auger during fold and allows us to proportionally control this sequence effectively optimizing its velocity to be fast in the mid swing, and slow down at the end points not to generate a hard landing and damaging components.

Also, during this time, the auger tilt can also be actuated by this same sequence to tilt the auger up while unfolding to a desirable position.

During the fold sequence, our spout which can rotate will automatically rotate to a storage position. If it does not do this, it will contact the tank of the cart while folding down causing damage.

The system can also include an automatic gate closing system—where the user begins to drive away and the system detects a wheel speed above a threshold, and closes the gate automatically while the operator drives away. This prevents plugging in the event they forgot to close the gate after successfully unloading their cart. This sequence can also be attached to the auger fold sequence as well.

In one example, at the start, the user will have pressed the unfold button twice, then the auger is completely unfolded. The operator can also double press the fold button to initiate the auger fold sequence. If the spout would have moved while unfolded, it would automatically return to a designated home location during this sequence too, but it is in the correct position to start.

Automatic operation can be activated by many different methods. Preferred embodiments use a double press. Other possibilities could be: (i) a 2 stage button in which one stage is manual and the 2nd triggers an automatic command signal, (ii) a time delay; or (iii) an alternate button or "Shift" key.

The combined Auger Tilt, and Auger fold functions are not necessarily always used together. There are some machines that do not have a tilt feature.

Additional features that could be incorporated into the present invention include the following:

(i) Gate opening based on auger pivot angle: Automatically opening and closing of the gate proportionally to the vertical angle of the auger—i.e. steeper angle=slower flow therefore close the gates slightly to prevent plugging.

(ii) Ability to preset gate opening based on crop or conditions such as moisture—they change a crop in the program, it then uses a stored default max opening—or this could use a moisture sensor to restrict gate opening on high moisture crops.

(iii) Automatic unplugging sequence—Using an actuator to disconnect the horizontal drive and then automatically reengage when the plug is clear.

(iv) Full user control of the flow rates on each circuit—the user can define how fast or slow each circuit the joystick controls independently.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A grain cart control system for a grain cart connected to a towing vehicle in which the grain cart includes an auger fold actuator for folding and unfolding an unloading auger of the grain cart, a gate actuator for opening and closing a gate of the grain cart, and at least one spout actuator for controlling orientation of a spout of the unloading auger, each actuator including first and second valves associated therewith for controlling actuation in opposing first and second directions of the actuator; the control system comprising:

an input device adapted to be received within an operator cab of the towing vehicle to receive operator commands from an operator of the towing vehicle and generate corresponding command signals responsive to the operator commands;
an electronic controller adapted to be operatively connected to the input device to receive the command signals from the input device and al operatively associated with at least one of the actuators of the grain cart;
a valve actuator adapted to be operatively connected to each valve of said at least one of the actuators of the grain cart;
the controller including command criteria stored thereon in which the command criteria are associated with a defined operator command, the controller comprising a memory storing programming instructions thereon and a processor arranged to execute the programming instructions whereby the controller is operable to (i) compare the command signals received from the input device to the command criteria stored on the controller and determine if the command criteria for the defined operator command have been met and (ii) generate activation signals for the valve actuators to execute the defined operator command in response to determination that the command criteria associated with the defined operator command have been met.

2. The control system according to claim 1 wherein each valve actuator is an electro-hydraulic pulse width modulated valve actuator.

3. The control system according to claim 1 further comprising a plug sensor to detect a plug in the unload auger and a drive actuator adapted to be operatively connected between a drive input and a bottom auger of the grain cart in which the drive actuator is operable between an engaged position in which the drive input is engaged with the bottom auger and a disengaged position in which the drive input is disengaged with the bottom auger, the controller being arranged to generate activation signals to displace the drive actuator into the disengaged position in response to the plug sensor detecting a plug and to displace the drive actuator into the engaged position in response to the plug sensor detecting absence of a plug.

4. The control system according to claim 1 wherein the command criteria defining one operator command comprises a unique sequence of button actuations on the input device.

5. The control system according to claim 4 wherein the command criteria defining one operator command comprises two sequential actuations of a common button on the input device.

6. The control system according to claim 4 wherein the command criteria defining one operator command comprises two sequential actuations of two different buttons on the input device.

7. The control system according to claim 4 wherein the command criteria defining one operator command comprises simultaneous actuation of two different buttons on the input device.

8. The control system according to claim 1 wherein the command criteria defining one operator command comprises continuous actuation of a single button on the input device for a duration which exceeds a prescribed threshold.

9. The control system according to claim 1 wherein the activation signals generated in response to determination of a single operator command comprises activation signals arranged to operate one of the actuators for a prescribed duration.

10. The control system according to claim 1 wherein the activation signals generated in response to determination of a single operator command comprise activation signals arranged to operate one of the actuators until a prescribed position is reached.

11. The control system according to claim 1 further comprising a position sensor associated with the gate actuator, wherein the controller is arranged to generate activation signals for the gate actuator such that a position of the gate actuator is proportional to a moisture setting stored on the controller.

12. The control system according to claim 11 wherein the moisture setting is input by an operator.

13. The control system according to claim 1 wherein the activation signals generated in response to determination of a single operator command comprise activation signals arranged to actuate two different ones of the actuators in sequence.

14. The control system according to claim 1 wherein the controller is arranged to generate activation signals for one of the actuators based upon a sensed condition associated with a different one of the actuators.

15. The control system according to claim 1 wherein each valve actuator is arranged to open the respective valve at a selected hydraulic flow rate with a range of selectable flow rates and wherein the activation signals generated by the controller include a designation of the selected hydraulic flow rate.

16. The control system according to claim 15 wherein the controller is arranged to generate activation signals which designate a flow rate which is fixed for a duration of activation of the actuator.

17. The control system according to claim 15 wherein the controller is arranged to generate activation signals which designate a flow rate which varies during activation of the actuator.

18. The control system according to claim 17 further comprising a position sensor associated with one of the actuators to detect a position thereof and wherein the controller is arranged to generate activation signals for said one of the actuators which designate the flow rate such that the flow rate varies according to the position detected by the position sensor.

19. The control system according to claim 1 for a grain cart including a tilt actuator for tilting the unloading auger, wherein the operator command corresponds to an auger unfolding command for unfolding the unloading auger, and wherein the controller is arranged to generate activation signals for the fold actuator to fully unfold the unloading auger and activation signals for the tilt actuator to vary a slope of the unloading auger in response to command signals from the input device which meet the command criteria associated with the auger unfolding command.

20. The control system according to claim 19 further comprising a position sensor associated with the tilt actuator to detect a position of the tilt actuator and wherein the controller is arranged to generate activation signals to actuate the tilt actuator until the sensed position reaches a prescribed target value in response to the command signals from the input device which meet the command criteria associated with the auger unfolding command.

21. The control system according to claim 1 the operator command corresponds to an auger unfolding command for unfolding the unloading auger, and wherein the controller is arranged to generate activation signals for the fold actuator to fully unfold the unloading auger and activation signals for the spout actuator to vary an orientation of the spout relative to the unloading auger in response to command signals from the input device which meet the command criteria associated with the auger unfolding command.

22. The control system according to claim 1 further comprising a position sensor associated with the fold actuator to detect a position thereof and wherein the operator command corresponds to an auger unfolding command for unfolding the unloading auger, wherein the controller is arranged to generate activation signals for the fold actuator to fully unfold the unloading auger in response to command signals from the input device which meet the command criteria associated with the auger unfolding command, in which the controller is arranged to generate the activation signals with a designated flow rate associated therewith which varies according to the position detected by the position sensor.

23. The control system according to claim 22 wherein the controller is arranged to generate the activations signals such that the flow rate increases through an intermediate portion of the auger unfolding relative to at least one end portion of the auger unfolding.

24. The control system according to claim 1 wherein the operator command corresponds to an auger folding command for folding the unloading auger, and wherein the controller is arranged to generate activation signals for the fold actuator to fully fold the unloading auger and activation signals for the gate actuator to fully close the gate in response to command signals from the input device which meet the command criteria associated with the auger unfolding command.

25. The control system according to claim 1 wherein the operator command corresponds to an auger unfolding command for folding the unloading auger, wherein the command criteria defining the auger unfolding command comprises two sequential actuations of a common button on the input device, and wherein the controller is arranged to generate activation signals for the fold actuator to fully unfold the unloading auger in response to command signals from the input device which meet the command criteria associated with the auger unfolding command.

26. The control system according to claim 1 wherein the operator command corresponds to an auger folding command for folding the unloading auger, wherein the command criteria defining the auger unfolding command comprises two sequential actuations of a common button on the input device, and wherein the controller is arranged to generate activation signals for the fold actuator to fully fold the unloading auger in response to command signals from the input device which meet the command criteria associated with the auger folding command.

27. The control system according to claim 1 for a grain cart including a tilt actuator for tilting the unloading auger, the system further comprising position sensors associated with the tilt actuator and the gate actuator respectively to detect positions thereof, wherein the controller is arranged to generate activation signals to operate the gate actuator such that the position of the gate actuator is proportional to the position of the tilt actuator.

28. The control system according to claim 11 further comprising a moisture sensor arranged to sense a moisture content of a product stored on the grain cart, the controller being arranged to determine the moisture setting according to the sensed moisture content.

29. A grain cart control system for a grain cart connected to a towing vehicle in which the grain cart includes an auger fold actuator for folding and unfolding an unloading auger of the grain cart, a gate actuator for opening and closing a gate of the grain cart, and at least one spout actuator for controlling orientation of a spout of the unloading auger, each actuator including first and second valves associated therewith for controlling actuation in opposing first and second directions of the actuator; the control system comprising:

an input device adapted to be received within an operator cab of the towing vehicle to receive operator commands from an operator of the towing vehicle and generate corresponding command signals responsive to the operator commands;

an electronic controller adapted to be operatively connected to the input device and operatively associated with at least one of the actuators of the grain cart;

a valve actuator adapted to be operatively connected to each valve of said at least one of the actuators of the grain cart;

the controller including command criteria associated with an operator command stored thereon whereby the controller is operable to generate activation signals for the valve actuators to execute the operator command in response to one or command signals from the input device which meet the command criteria associated with the operator command;

the controller is being arranged to generate activation signals associated with more than one actuator of the grain cart in response to saki one or more command signals that meet the command criteria associated with a single operator command stored on the controller.

30. A grain cart control system for a grain cart connected to a towing vehicle in which the grain cart includes an auger fold actuator for folding and unfolding an unloading auger of the grain cart, a gate actuator for opening and closing a gate of the grain cart, and at least one spout actuator for controlling orientation of a spout of the unloading auger, each actuator including first and second valves associated therewith for controlling actuation in opposing first and second directions of the actuator; the control system comprising:

an input device adapted to be received within an operator cab of the towing vehicle to receive operator commands from an operator of the towing vehicle and generate corresponding command signals responsive to the operator commands;

an electronic controller adapted to be operatively connected to the input device and operatively associated with at least one of the actuators of the grain cart;

a valve actuator adapted to be operatively connected to each valve of said at least one of the actuators of the grain cart; and a position sensor associated with one of the actuators to detect a position thereof;

the controller including command criteria associated with an operator command stored thereon whereby the controller is operable to generate activation signals for the valve actuators to execute the operator command in response to one or command signals from the input device which meet the command criteria associated with the operator command; and the controller being arranged to generate the activation signals for said one of the actuators having the position sensor associated therewith in response to determination of a single operator command such that the activation signals are arranged to operate said one of the actuators having the position sensor associated therewith until the position thereof reaches a prescribed target value.

31. The control system according to claim 30 wherein the prescribed target value is programmably adjustable by the operator.

* * * * *